FIXTAKING MEANS AND METHOD
Filed Nov. 18, 1959 4 Sheets-Sheet 1
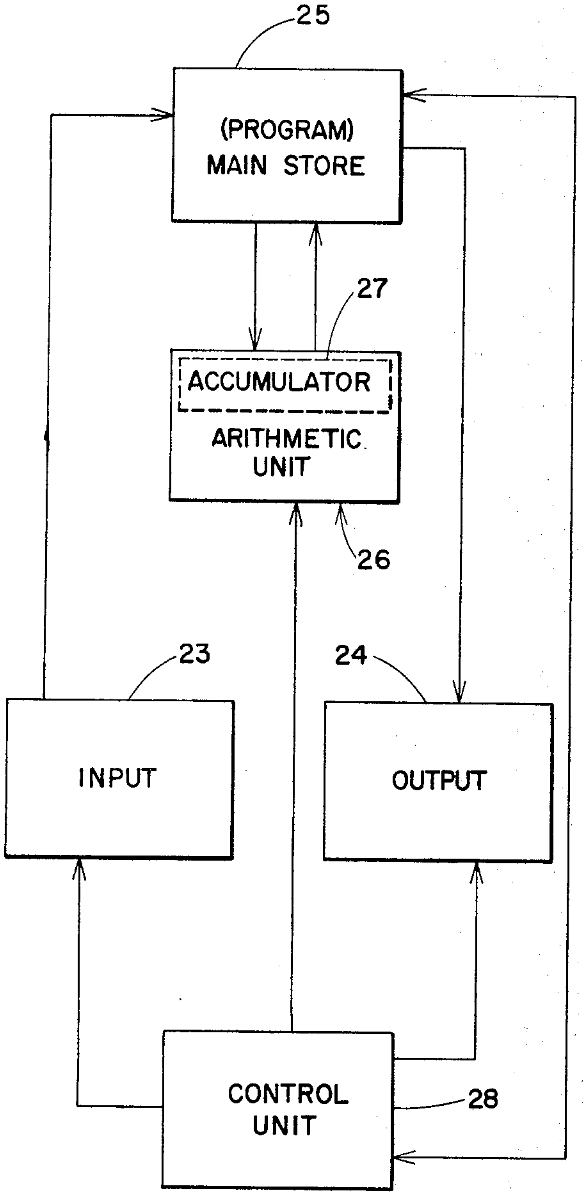
FIG. 7
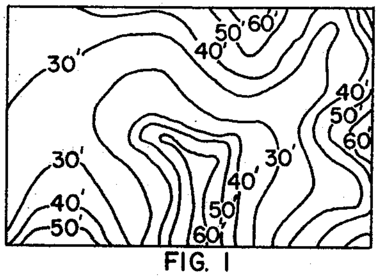
FIG. 1
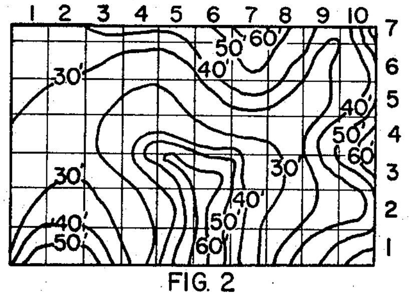
FIG. 2
| | | | | | | | | | |
|---|---|---|---|---|---|---|---|---|---|
| 30 | 30 | 30 | 30 | 30 | 40 | 50 | 40 | 30 | 40 |
| 30 | 30 | 30 | 30 | 30 | 30 | 40 | 30 | 30 | 40 |
| 30 | 30 | 30 | 40 | 40 | 30 | 30 | 30 | 40 | 60 |
| 30 | 30 | 30 | 40 | 50 | 40 | 40 | 30 | 30 | 50 |
| 30 | 30 | 30 | 30 | 40 | 60 | 40 | 30 | 30 | 40 |
| 40 | 50 | 40 | 30 | 50 | 60 | 40 | 30 | 40 | 60 |
FIG. 3
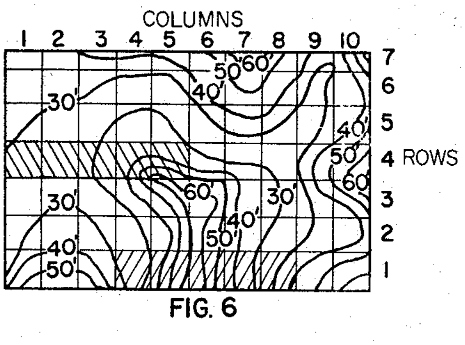
FIG. 6
INVENTOR.
WILLIAM C. HALLMARK
BY H. C. Goldwire
AGENT INVENTOR.
WILLIAM C. HALLMARK
BY H.C. Goldwire
AGENT

FIXTAKING MEANS AND METHOD

Filed Nov. 18, 1959 4 Sheets-Sheet 3

| | | | | | | | | | |
|---|---|---|---|---|---|---|---|---|---|
| 1 | 2 | 3 | 4 | 5 | 6 | 7 | 8 | 9 | 10 |
| 30 | 30 | 30 | 30 | 30 | 40 | 50 | 40 | 30 | 40 |
| 11 | 12 | 13 | 14 | 15 | 16 | 17 | 18 | 19 | 20 |
| 30 | 30 | 30 | 30 | 30 | 30 | 40 | 30 | 30 | 40 |
| 21 | 22 | 23 | 24 | 25 | 26 | 27 | 28 | 29 | 30 |
| 30 | 30 | 30 | 40 | 40 | 30 | 30 | 30 | 40 | 60 |
| 31 | 32 | 33 | 34 | 35 | 36 | 37 | 38 | 39 | 40 |
| 30 | 30 | 30 | 40 | 50 | 40 | 40 | 30 | 30 | 50 |
| 41 | 42 | 43 | 44 | 45 | 46 | 47 | 48 | 49 | 50 |
| 30 | 30 | 30 | 30 | 40 | 60 | 40 | 30 | 30 | 40 |
| 51 | 52 | 53 | 54 | 55 | 56 | 57 | 58 | 59 | 60 |
| 40 | 50 | 40 | 30 | 50 | 60 | 40 | 30 | 40 | 60 |
| 61 | 62 | 63 | 64 | 65 | 66 | 67 | 68 | 69 | 70 |
| 30 | 50 | 60 | 40 | 30 | 10 | 0 | 20 | 10 | 20 |
| 71 | 72 | 73 | 74 | 75 | 76 | 77 | 78 | 79 | 80 |
| 0 | 10 | 0 | 20 | 10 | 20 | 60 | | | |

81 82 83 84 85 86 87 88 89 90 91 92 93 94 95

INVENTOR.
WILLIAM C. HALLMARK
BY H. C. Goldwire
AGENT

INVENTOR.
WILLIAM C. HALLMARK
BY H.C. Goldwire
AGENT 3,328,795

FIXTAKING MEANS AND METHOD

William C. Hallmark, Fort Worth, Tex., assignor, by mesne assignments, to Ling-Temco-Vought, Inc., Dallas, Tex., a corporation of Delaware Filed Nov. 18, 1959, Ser. No. 853,911
22 Claims. (Cl. 343—7)

This invention relates to place-finding systems in general and more particularly to a system for locating the position of a body, movable over a surface which varies in elevation, within a given area of that surface.

In one example of its important usages, the invention is employed in conjunction with a dead reckoning navigational system.

In the past several years, tremendous strides forward have been taken in the field of navigational dead reckoning techniques. Among recent developments in this field have been the introduction of computers and the development of velocity, acceleration, and direction sensing devices of high accuracy. However, despite the tremendous advances made in dead reckoning guidance systems employed for bringing a craft or vehicle precisely to a certain geographic location, a fix-taking correctional guidance system must still be used in conjunction with the dead reckoning system, because of the characteristic accumulation of dead reckoning error in the latter, if high accuracy of navigation is required.

Generally speaking, the reference data necessary for use in a correctional system can be derived by several techniques and from a variety of sources. Two common methods use celestial observation and the recognition of some earth-fixed parameter. While stellar monitoring can usually be satisfactorily employed at high altitudes, several factors prevent its use in high-speed, low-altitude vehicles. First, weather and cloud cover impose operational limitations in land and air vehicles and in vessels operating at and near the surface of water. Secondly, a turbulent boundary layer is formed during low and medium altitude flights of aerial vehicles which causes image diffusion and defraction and therefore a corresponding degradation in accuracy. Obviously, optical observation of stellar bodies is not readily practicable, in the case of a vessel traveling deep beneath the surface of a body of water, for providing stellar reference data for fixtaking.

One earth fixed parameter data source is topographic information. Many guidance systems were devised in the past which, at least in aircraft, made use of topographic information as reference data for fixtaking. Some of these systems made use of radar derived topographic data, and large efforts were expended in developing radar map matching techniques. Systems of this type have been in existence for roughly ten years, but have never been completely satisfactory because, primarily, of their high degree of complexity.

It will be understood that, as employed herein, the term "navigation" refers to the conducting of aircraft and ships from place to place and further is intended to refer, and expressly does refer, to the conducting of any other body from place to place. Thus, while the specific example provided herein is in connection with an aircraft, the sequence of elevations, relative to some fixed reference, from one to the other along a given series of discrete points on the ocean bottom is as unique as along a similar series of points on land; and the elevation sequence along a series of spaced points on land is no less unique when the points are passed over by a land-contacting vehicle than when flow over by an aircraft. The invention, therefore, is specifically applicable also to the navigation of submarine vessels and land vehicles and, in fact, of any body which moves over a surface, the earth's crust being one example thereof, whose altitude varies from place to place with reference to a given altitude datum. While, in the specific example, altimeters are referred to as preferred means for determining both the absolute altitude of an aircraft relative to a reference datum and the height of the aircraft above the earth, the invention is by no means limited to the use of such instruments and its scope is such as to include, in other applications, the use of fathometers and/or pressure-sensing devices giving information indicative of the altitude of the earth's crust and specifically the interval separating a vessel from the ocean bottom and/or surface.

While the term "terrain" ordinarily has been employed, in the past, with references to land areas, it is expressly adopted and employed herein as a term referring to any surface area, such as that of the earth's crust, whether that area be covered with water or air.

Previously proposed fixtaking and navigational systems have sought to utilize terrain elevation data, and they have been based upon the analog comparison of sample data, which are the continuous, analog representation of continuous variations in terrain elevations, with similar data contained in contour maps employed as such. At least some of the sample and known data hence have always been graphically or photographically displayed on actual sheets of paper, rectangles of photographic film, etc., and the values represented thereby have been shown as physically measurable along at least two axes. Because of the nature of the data employed, cumbersome and unwieldly equipments for photographic development, superposition of map over map, orthogonal adjustments of one set of data relative to another, etc. have been unavoidable sources of added weight, complexity, error, and malfunction.

The present invention does not employ continuously recorded, analog data, but has as one of its bases the use of quantized terrain altitude information taken at discrete points. A numerical comparison of sample and pre-recorded data is performed at high speed, and with results predictable and repeatable for the same inputs, by a digital computer. Since the digital computer and associated components are relatively unaffected by noise, vibrations, nuclear radiation, etc., no equipment is required for performing two-dimensional data comparisons, and no feedback or nulling circuitry is needed for determining the point of best physical correlation of the sample with the pre-recorded data. As distinguished from systems utilizing analog information, the digital computer is free from the sources of error unavoidably present where analog comparisons are made and hence is not only more accurate but is able to tolerate relatively large errors in sample and known data values without compromising fixtaking accuracy.

An ideal fixtaking guidance system should possess operational flexibility and should perform satisfactorily where nuclear radiation or other adverse environmental and/or flight conditions exist. Moreover, the system should preferably possess the attributes of simplicity, accuracy, and reliability and desirably should be compact and lightweight.

It is, therefore, an object of the present invention to provide an accurate and reliable fixtaking guidance system.

Another object of the present invention is to provide a simple, compact, lightweight fixtaking guidance system.

Another object is to provide a fixtaking guidance system making use of equipment normally carried aboard the vehicle and therefore adding but few components to those already carried.

Another object of the present invention is to provide a flexible fixtaking guidance system of high environmental adaptability.

Another object of the present invention is to provide a fixtaking guidance system having intelligence-input requirements which are favorably low.

Another object of the present invention is to provide a fixtaking guidance system capable of operation at low to medium altitudes and at supersonic velocities.

Another object of the present invention is to provide a fixtaking correctional system for use in conjunction with a dead reckoning guidance system to correct the error inherent therein.

Another object of the present invention is to provide a novel method of compensating for the accumulative error inherent in any dead reckoning guidance system.

Other and further objects and advantages of the present invention will become apparent from a consideration of the following description when read in light of the accompanying drawing in which:

FIGURE 1 is a view of a portion of a contour map;

FIGURE 2 is a view of FIGURE 1 with a grid superimposed thereon;

FIGURE 3 is a numerical matrix prepared from the gridded contour map portion of FIGURE 2;

FIGURE 6 is a view of FIGURE 2 with actual and intended data-sampling positions cross hatched thereon;

FIGURE 7 is a block diagram illustrative of one data comparison method;

Figure 4:
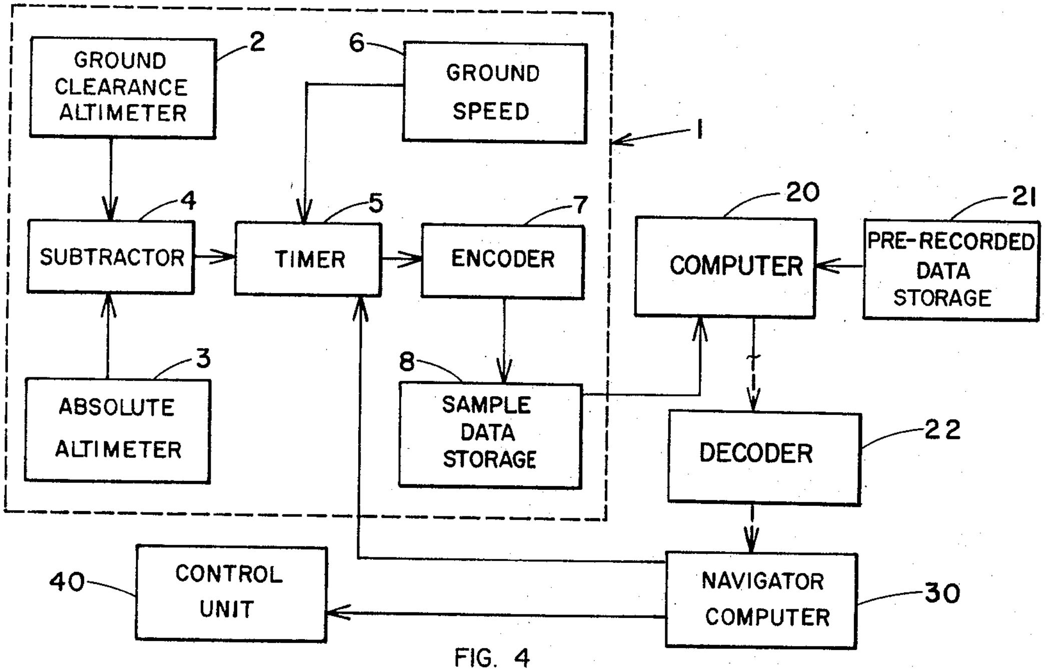
FIGURE 4 is a block diagram of one embodiment of the fixtaking guidance system.

Briefly, the present invention is a system for determining the position of a movable body with respect to a given area of a surface, which system employs discrete data items relating to variations in elevation of the surface relative to a given datum. The analytical basis of the invention is that a sequence of data taken at discrete points and representative of elevation variations of a surface are unique and distinguishable from other sequences of data taken at other points on the surface. Means are provided to obtain, in quantized form, the surface elevation at a series of spaced points. This sequence of discrete surface elevation data is numerically correlated with known, quantized surface terrain elevation data previously stored in the computer memory. The location where the sequence of elevations "best fits" in the stored data defines the actual location of the vehicle or other moving body at the time the sample data were taken.

In carrying out the present invention for correctional navigational fixtaking, a determination is made as to where, when, and how often corrective positional fixes are to be made. Among the factors influencing this determination are the maximum anticipated error of the dead reckoning system, the availability and quality of terrain contour source material, and the "roughness" of the terrain. For the purpose of clarity of illustration, only one corrective positional fixtaking will be described. It should be understood, however, that in a normal mission a plurality of positional fixes are taken where required in accordance with the above mentioned determinative factors.

Accumulation of data describing the relative elevations of terrain points within a selected fixpoint area is a necessary prerequisite to corrective fixtaking. These data will normally be in the form of contour maps or photographs in a variety of scales and contour intervals. A terrain description containing three or more contour levels is preferred; however, analytical studies have indicated that two-level maps yield acceptable fixes. Additionally, the contour interval should be such as adequately describes the terrain.

It has been found, through both analytical studies and actual flight tests, that (in the present system as distinguished from previous systems) large errors in elevation can be tolerated without affecting the location of "best fit." Thus, in the present invention, meager map data can be used without greatly affecting the fixtaking accuracy.

Refer first to FIGURE 1, which shows a contour map of the proposed corrective fixpoint area. The contour map is shown gridded in FIGURE 2 and the terrain elevation at a selected point, e.g., at the center of each grid square, is determined and recorded in matrix form as shown in FIGURE 3. Attention is called to the fact it is not necessary that the terrain elevation at the grid square centers be used; instead, other reference points such as the intersections of the grid lines may be used so long as consistency is employed. The grid lines must, however, be spaced in accordance with the intended spacing of the sample data points to be later taken in actual flight in order that accurate correlation may be made between the two.

In the above-described manner, quantized terrain intelligence data is obtained which may be stored in a memory device, thereby making it available for later use as a discrete, three dimensional, numerical description of the fixpoint terrain elevation variations.

Refer next to FIGURE 4, which shows one embodiment of a fixpoint guidance system. This fixpoint guidance system includes a terrain data sampling means 1 comprising a ground clearance altimeter 2, an absolute altimeter 3, a subtractor 4, a timer 5, a ground speed information source 6, an encoder 7, and a simple data storage means 8. The ground clearance altimeter 2, which may be of the downward-looking radar type, furnishes an indication of aircraft height over terrain to the subtractor 4 which also is furnished with an indication of vehicle height above a fixed reference (such as sea level) by the absolute altimeter 3. In the preferred embodiment of the invention, the absolute altimeter 3 is of the barometric type and preferably employs sensing means such as a vertical accelerometer in conjunction therewith to sense and correct for spurious altitude deviations in applications where such deviations are significant.

The output of both the absolute altimeter 3 and the ground clearance altimeter 2 are in analog form, and thus it is well within the art to provide a subtractor 4 having an analog output indicative, at any given time, of the elevation of the terrain point directly beneath the vehicle. The output of the subtractor 4 is supplied to the timer 5 which controls the spacing of the terrain data sample points in accordance with aircraft ground speed, indications of which are supplied to the timer 5 by the ground speed data source 6. In this manner, the spacing of the terrain data sample points is made to conform to the spacing of the pre-recorded terrain intelligence data.

The terrain data sample points are supplied by the timer 5 to the encoder 7 which converts the analog output of the timer 5 to a digital notation such as binary. The binary representation of the terrain data sample points is then stored in the sample data storage means 8 which may be of any of several forms of storage medium such as disc, drum, tape, ferrite core memory device, etc.

In operable association with the terrain data sampling means 1 is the computer 20 which compares the terrain data sample points with the pre-recorded terrain intelligence data contained in the pre-recorded data storage means 21 to determine the "best fit" and thus, as is hereinafter described, to furnish an accurate indication as to the actual geographic position of the vehicle at the time that the sample points were taken. The output of the computer 20, which is indicative of the actual vehicle position, is then supplied in digital form to the navigator computer 30 which in turn furnishes a correction signal to the control unit 40. If, however, the navigator computer 30 employed is of a kind requiring analog data inputs, the output of the computer 20 is converted from digital to analog form by passing it through a decoder 22 as shown, the decoder 22 not being necessary if the navigator computer accepts digital data.

Figure 10:
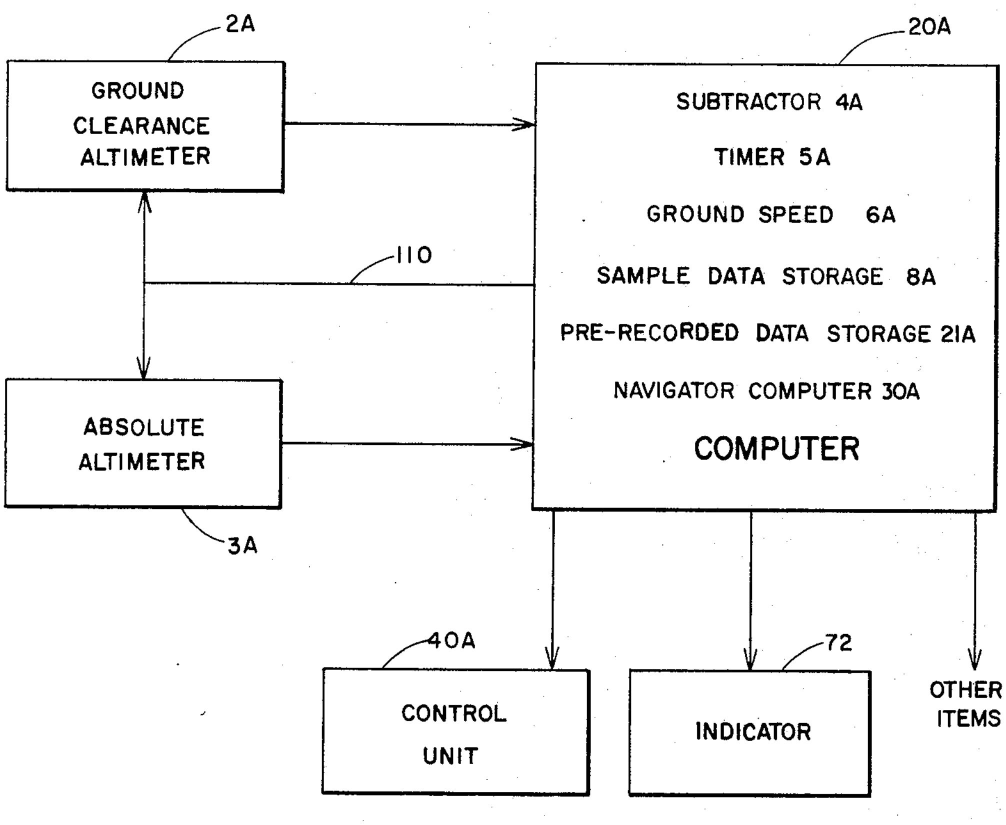
FIGURE 10 is a block diagram of a modification of the embodiment shown in FIGURE 4.

While in the present description an encoder 7 and decoder 22 have been included, it will be obvious to those skilled in the art that it is a simple matter to provide elements for use in the fixpoint guidance system having inputs and outputs compatible with the requirements of the computer 20. For instance, in the example shown in FIGURE 10, the outputs of the altimeters 2A and 3A are in digital form. Furthermore, the subtractor 4A, timer 5A, ground speed data source 6A, sample data storage means 8A, pre-recorded data storage means 21A, and navigator computer 30A are included in computer 20A in the sense that all their functions are accomplished by the latter. The digital outputs of the altimeters 2A, 3A, in this case, are fed to the computer 20A, which latter performs all necessary computations and provides correction signals to the control unit 40A, indicator 72, or other items as desired. The connection 110 provides a means for delivery, from the computer 20A to the altimeters 2A, 3A, of signals initiating the taking of altitude data for the fixtaking operation and the timing of the intervals separating the discrete data items taken. Therefore, the items 4, 5, 6, 21, 30 shown in FIGURE 4 can be considered functional elements of the system which are not necessarily separate physical entities extraneous to the computer 20 of FIGURE 4.

Under the term "navigator computer" have been included those components normally included in a dead reckoning guidance system. Briefly, a dead reckoning guidance system may have means including an inertial platform which is gyroscopically stabilized and has mounted thereon accelerometers to detect vehicle accelerations relative to inertial space. The output of these platform sensors is then acted upon by a computing device which in turn sends guidance signals to the vehicle flight control system 40. From the inertial platform information, the computer produces a solution, which may be continuous, to the problem of aircraft geographic location and provides signals to the vehicle flight control system 40 which are such as to produce, within the degree of error inherent in the system, the desired flight path. It is, of course, this inherent error, the magnitude of which increases with time, that the present guidance system seeks to eliminate.

Figure 5:
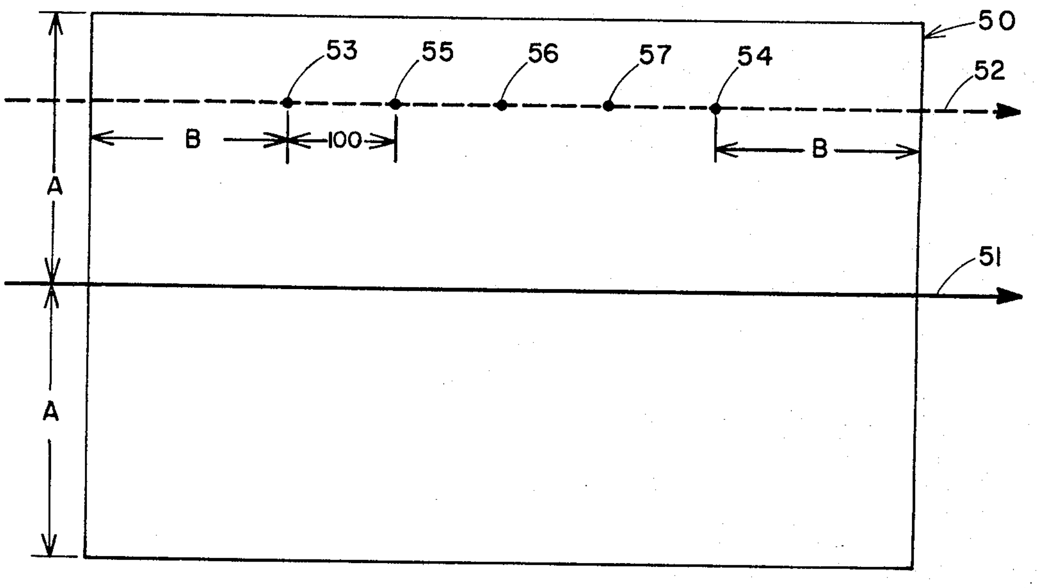
FIGURE 5 is a schematic diagram of a possible fixtaking data-sampling path.

In FIGURE 5 is shown the vehicle flight path 51 as indicated by the dead reckoning guidance system and the actual vehicle flight path 52 through a pre-recorded fixpoint area 50. Along the actual flight path 52, terrain data samples are taken from point 53 to point 54 at discrete intervals 100. The size of the fixpoint terrain area 50 to be stored is a function of several parameters, one of which is the inherent error of the dead reckoning guidance system.

Where, as is preferable, terrain data samples are taken while the aircraft flies a straight course, the pre-recorded fixpoint terrain area 50 preferably is bisected by the intended flight or ground track 51 of the vehicle. To each side of the intended ground track 51, the fixpoint terrain 50 is as wide as is required to ensure that the actual flight path or ground track 52 of the vehicle will be through the pre-recorded terrain area in spite of errors of the dead reckoning guidance system. For example, if the known possible error in the dead reckoning guidance system during the time required to arrive at the fixpoint, area 50 could result in a flight path laterally displaced by a maximum interval A of four miles from the intended flight path 51, then the fixpoint terain area 50 should be at least eight miles wide. In addition, according to one usage of the invention, and assuming that the maximum possible error in position during the time required to reach the fixpoint terrain area 50 is equal to an interval B of three miles, then the length of the fixpoint area should extend at least three miles beyond the first and last sample points 53 and 54, respectively. Thus, it is relatively certain that all of the sample data points, five points 53, 55, 56, 57, 54 being shown schematically, will surely fall somewhere within the pre-recorded terrain area 50.

In another sample-taking technique (not illustrated), data samples are taken along the length of a ground track which is long enough to ensure that the pre-recorded terrain area will fall within it, and thus no interval corresponding to B need be provided for as in FIGURE 5.

Refer again to FIGURE 4. When, according to the navigator computer 30, the vehicle is near or has entered the fixpoint terrain area 50, a signal is supplied by it to the timer 5, thereby initiating the taking of terrain data sample points. In its relation to the terrain data sampling means 1, and more specifically to the timing means 5, the navigator computer therefore is an initiating means. The timer 5, as mentioned previously, controls the time-wise spacing of the data sample points in accordance with vehicle ground speed to ensure that the output of the subtractor 4 is supplied to the sample data storage means 8 at discrete points so separated as to result in the storage of a series of data sample points each spaced apart by a linear interval 100 (FIGURE 5) which is compatible with the spacing employed in the pre-recorded terrain intelligence data map matrix.

Figure 11:
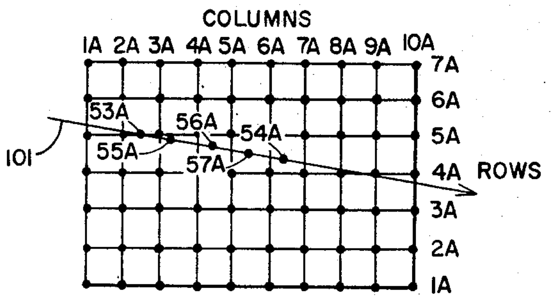
FIGURE 11 is a schematic diagram of a possible sample-data course across an area containing known elevations.

The above is not to be taken to imply that the sample data points must fall precisely upon the terrain points represented by the pre-recorded data. As shown in FIGURE 11, it is entirely possible that the line 101 of sample data will fall between lines and for example, will cut across the rows 4A, 5A of the pre-recorded data; and the sample data points 53A, 55A, 56A, 57A, 54A similarly will not be in precise alignment with the pre-recorded data rows and columns. Because of the numerial matching provided by the system, however, this is of no detriment to fixtaking accuracy, for the spacing of the pre-recorded data points may arbitrarily be made as small as desired down to the limitations of consistency with the topographical maps, etc. employed as source materials. For the same reason, some angling of the actual flight path across a row or rows of the pre-recorded data is inconsequential, as is also some discrepancy from that intended in spacing between sample and pre-recorded data points. It will be understood that other than orthogonal geometrical arrangements of pre-recorded data points lie within the scope of the invention, and that other arrangements allow even more freedom of direction, while crossing the fixtaking area, without loss of fixtaking accuracy. An example of such an arrangement is one employing pro-recorded data points arranged in and about a basic geometric unit in the form of a hexagon, as many of the said basic units being employed as are needed for giving a fixtaking area of a desired size.

In order to determine the actual geographical location of the vehicle, a comparison or correlation must be made between the terrain data acquired by sampling along the actual ground track 52 (FIGURE 5) and the pre-recorded terrain intelligence data stored in the pre-recorded data storage means 21 of FIGURE 4 in order that a determination may be made as to where the sample terrain data "best fit" the pre-recorded data. The "best fit" will be indicative of the actual location of the vehicle, at the time the sample data were taken, as distinguished from the location at a point along the intended flight path 51 indicated by the dead reckoning guidance system.

Refer next to FIGURE 6. Assume that the actual ground track of a vehicle while taking samples was along that portion of the fixpoint terrain area corresponding to row 1, columns 4–8, while the dead reckoning system indicated that the vehicle was at that time over an area corresponding to row 4, columns 1–5.

In order to determine the actual location of the vehicle during the time of sample taking, the terrain sample data points are everywhere compared with the pre-recorded data to determine that portion of the pre-recorded map matrix where the sample data points "best fit." For instance, assume that a map matrix corresponding to FIGURE 3 were stored in the pre-recorded data storage means 21. One method of comparison is to compare the terrain data samples with a like number of pre-recorded terrain intelligence data points, which number, in the simplified example, is five. Thus, the terrain data samples might be compared with the terrain intelligence data found in row 1, columns 1–5. The next comparison would be made with the terrain intelligence data found in row 1, columns 2–6. The terrain samples are then similarly compared with every other possible same-length, consecutive series of pre-recorded data in row 1. A comparison is then likwise made of row 2, then row 3, then row 4, etc. Thus, the row-segment of the map matrix having the least variation from the sample data is located, thereby yielding the exact geographical position of the vehicle during the terrain data sample-taking.

Any of a number of analytical comparison methods can be used in comparing the terrain sample data with the pre-recorded intelligence data in order to obtain an error function. For example, solution of the equation $$MSD=\frac{1}{N}\sum_{i=1}^{N}[f(x)_i-g(x)_i]^2\Delta x-\left\{\frac{1}{N}\sum_{i=1}^{N}[f(x)_i g(x)_i]\Delta x-\right\}^2$$

where:

$f(x)$ = the map function
$g(x)$ = the terrain function
$N$ = number of points in the terrain sample yields the "means square difference" error function for a given comparison. Thus, each point of comparison yields an error function which may be compared with the error functions generated at other points of comparison to determine the point at which the minimum error function occurs and thus to identify the exact geographical position of the vehicle during sample-taking.

Another method of analytical comparison is the "mean absolute difference" method, which method is as valid as the MSD criterion and in addition can be determined by use of a less sophisticated computer since no "squarer" is necessary. The "means absolute difference" of a given series of terrain and map data is found by solving the following equation:

$$MAD=\sum_{i=1}^{N}\left|(x_i-y_i)-\frac{1}{N}\sum_{i=1}^{N}(x_i-y_i)\right|$$

where:

$x_i$ = the map matrix data points
$y_i$ = the terrain sample data points
$N$ = the number of terrain sample points.

As was previously stated, it is well within the art to provide other comparison methods such as numerical, digital cross-correlation of the two functions, or the normalized value of the functions; however, for the sake of brevity, no discussion will be made herein of such other methods.

In FIGURE 7 is shown a block diagram for illustrating one method of accomplishing the "mean absolute difference" comparison including input equipment 23, output equipment 24, a main store 25, an arithmetic unit 26, and a control unit 28. Cross referencing to FIGURE 4, the input unit 23 corresponds to the encoder 7 and sample data storage means 8 of FIGURE 4, while the output unit 24 corresponds to the decoder 22 and other equipment necessary for receiving the computer output such as the navigator-computer 30 and the flight control unit 40. In addition, the main store 25 is inclusive of the pre-recorded data storage means 21 of FIGURE 4.

The main store 25 includes the computer memory and any special registers employed. The main store will eventually contain the terrain data samples, the pre-recorded map-matrix, and the program. Each sample point of the terrain data samples and each data point of the map-matrix will be stored in a one-word register in the main store 25. Both the data words and the instruction words contained in the main store 25 are assigned addresses in order to render them readily obtainable.

The arithmetic or data processing unit 26 contains an accumulator 27 and such other units as are necessary to perform the required operations. Since division in a computer can be performed as a series of subtractions and since subtraction can be performed by an adder in conjunction with a complementer, only adders, complementers, and sign and magnitude comparators are needed in the solution of the linear difference equation.

In operation of the guidance system, the terrain data samples are first transferred to the main store 25 from the input equipment 23 by the control unit 28 under instructions derived from the program 25. The control unit 28 then takes the next instruction word from the program 25 and sets the proper circuits for the indicated operation. The instruction word contains the address of the data to be used in the computation, the operation to be performed, and the control address of, or where to find, the next instruction word. When an instruction word has been received in the control unit 28, the latter, by means of a switching arrangement which functions as an address selector, takes the data to be operated on from the main store 25, transfers it to the arithmetic unit 26, causes the data to be processed in accordance with the instructions provided from the program 25, and returns the result to the main store 25. The control unit 28 then accepts the next instruction word and causes the indicated operation to be performed. This operation is repeated until the program has been completed. In this instance, the program is completed when the "best fit" has been determined.

One method of solving the "mean absolute difference" equation $$MAD=\sum_{i=1}^{N}\left|(x_i-y_i)-\frac{1}{N}\sum_{i=1}^{N}(x_i-y_i)\right|$$

will be described.

Figures 8, 9:
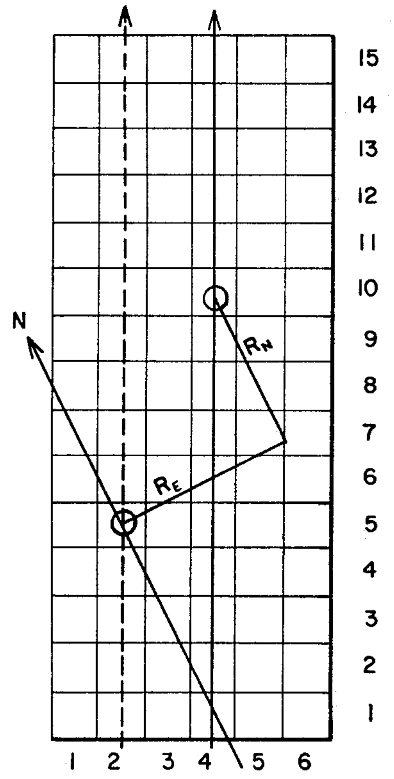
FIGURE 8 is a diagram illustrative of a map matrix and sample data points addressed for computation.
FIGURE 9 is a diagram illustrating dead reckoning error.

Let $N=5$ and let the terrain data points ($y_i$) and the map data point ($x_i$) be stored and addressed as shown in FIGURE 8, wherein rows 81, 83, 85, 87, 89, 91, 93, 95 contain the storage register addresses while rows 82, 84, 86, 88, 90, 92, 94 contain the associated terrain altitude data.

As will be obvious, the data contained in storage registers 1–60 correspond to the map matrix of FIGURE 3 while the data contained in registers 61–65 correspond to the five data samples of row 1, columns 4–8 of FIGURE 6. Registers 66–77 contain the results of the herein-described comparisons.

Comparison of the five data sample points contained in registers 61–65 with the five pre-recorded data points contained in registers 51–55 will be described. Other same-length comparisons are of course made as previously described with same-length segments of the map matrix to determine the lowest error function MAD corresponding to the actual vehicle location during data sample taking.

For the purposes of brevity, the following legend will be used:

A($m$)—add the contents of storage location $m$ to the contents of the accumulator
B($m$)—bring the contents of storage location $m$ into the cleared accumulator
M($m$)—copy the contents of the accumulator and store it in register $m$
D($m$)—divide the contents of the accumulator by $m$ S($m$)—subtract the contents of storage location $m$ from the contents of the accumulator T($m$)—test sign of accumulator: if positive, transfer control to ($m$); if negative, proceed to next instruction

| Instruction | | Remarks |
|---|---|---|
| 1 | B(51) | $x_1$ into the accumulator. |
| 2 | S(61) | $(x_1-y_1)$ |
| 3 | M(66) | $(x_1-y_1)$ into register 66. |
| 4 | B(52) | $x_2$ into the accumulator. |
| 5 | S(62) | $(x_2-y_2)$ |
| 6 | M(67) | $(x_2-y_2)$ into register 67. |
| 7 | B(53) | $x_3$ into the accumulator. |
| 8 | S(63) | $(x_3-y_3)$ |
| 9 | M(68) | $(x_3-y_3)$ into register 68. |
| 10 | B(54) | $x_4$ into the accumulator. |
| 11 | S(64) | $(x_4-y_4)$ |
| 12 | M(69) | $(x_4-y_4)$ into register 69. |
| 13 | B(55) | $x_5$ into the accumulator. |
| 14 | S(65) | $(x_5-y_5)$ |
| 15 | M(70) | $(x_5-x_5)$ into register 70. |
| 16 | A(66) | $(x_5-y_5)+(x_1-y_1)$ |
| 17 | A(67) | $(x_5-y_5)+(x_1-y_1)+(x_2-y_2)$ |
| 18 | A(68) | $(x_5-y_5)+(x_1-y_1)+(x_2-y_2)+(x_3-y_3)$ |
| 19 | A(69) | $(x_5-y_5)+(x_1-y_1)+(x_2-y_2)+(x_3-y_3)+(x_4-y_4)$ |
| 20 | D(5) | $[(x_5-y_5)+(x_1-y_1)+(x_2-y_2)+(x_3-y_3)+(x_4-y_4)]\div 5 = \frac{1}{N}\sum_{i=1}^{N}(x_i-y_i)$ |
| 21 | M(71) | $\frac{1}{N}\sum_{i=1}^{N}(x_i-y_i)$ into register 71. |
| 22 | B(66) | $(x_1-y_1)$ into the accumulator. |
| 23 | S(71) | $(x_1-y_1)-\frac{1}{N}\sum_{i=1}^{N}(x_i-y_i)$ |
| 24 | T(26) | $\lvert(x_1-y_1)-\frac{1}{N}\sum_{i=1}^{N}(x_i-y_i)=\lvert E_1$ |
| 25 | A($m_1$)[1] | |
| 26 | M(72) | $E_1$ into register 72. |
| 27 | B(67) | $(x_2-y_2)$ into the accumulator. |
| 28 | S(71) | $(x_2-y_2)-\frac{1}{N}\sum_{i=1}^{N}(x_i-y_i)$ |
| 29 | T(31) | $\lvert(x_2-y_2)-\frac{1}{N}\sum_{i=1}^{N}(x_i-y_i)=\lvert E_2$ |
| 30 | A($m_1$) | |
| 31 | M(73) | $E_2$ into register 73. |
| 32 | B(68) | $(x_3-y_3)$ into the accumulator. |
| 33 | S(71) | $(x_3-y_3)-\frac{1}{N}\sum_{i=1}^{N}(x_i-y_i)$ |
| 34 | T(36) | $\lvert(x_3-y_3)-\frac{1}{N}\sum_{i=1}^{N}(x_i-y_i)=\lvert E_3$ |
| 35 | A($m_1$) | |
| 36 | M(74) | $E_3$ into register 74. |
| 37 | B(69) | $(x_4-y_4)$ into the accumulator. |
| 38 | S(71) | $(x_4-y_4)-\frac{1}{N}\sum_{i=1}^{N}(x_i-y_i)$ |
| 39 | T(41) | $\lvert(x_4-y_4)-\frac{1}{N}\sum_{i=1}^{N}(x_i-y_i)=\lvert E_4$ |
| 40 | A($m_1$) | |
| 41 | M(75) | $E_4$ into register 75. |
| 42 | B(70) | $(x_5-y_5)$ into the accumulator. |
| 43 | S(71) | $(x_5-y_5)-\frac{1}{N}\sum_{i=1}^{N}(x_i-y_i)=E_5$ |
| 44 | T(46) | $\lvert(x_5-y_5)-\frac{1}{N}\sum_{i=1}^{N}(x_i-y_i)=\lvert E_5$ |
| 45 | A($m_1$) | |
| 46 | M(76) | $E_5$ into register 76. |
| 47 | A(72) | $E_5+E_1$ |
| 48 | A(73) | $E_5+E_1+E_2$ |
| 49 | A(74) | $E_5+E_1+E_2+E_3$ |
| 50 | A(75) | $E_5+E_1+E_2+E_3+E_4=E=MAD=\sum_{i=1}^{N}\lvert(x_i-y_i)-\frac{1}{N}\sum_{i=1}^{N}(x_i-y_i)\rvert$ |
| 51 | M(77) | E into register 77. |

[1] $m_1$ holds the constant 1.000000000.

Refer next to FIGURE 9, which is illustrative of a map matrix having data disposed in rows 1–15 and columns 1–6. Assume that the intended flight path is along column 4, while the actual flight path is along column 2. Assume further that, at a given instant, the intended position of the vehicle is at the point circled in column 4, row 10, while the actual location at that instant is the point circle in column 2, row 5. Where north is the direction N, the vehicle is thus the distance $R_B$ west and the distance $R_N$ south of the intended position. The north and east error having been ascertained, it is well within the art to correct for this dead reckoning error, the crucial operation being the determination of the actual position of the vehicle at the instant in time when the dead reckoning guidance system indicated its position to be at the point located in column 4, row 10.

In the above-described manner, there has been provided a navigational system which possess both operational flexibility and the ability to perform satisfactorily where adverse environmental and/or flight conditions exist. Furthermore, the device is simple, accurate, reliable, compact, and lightweight.

In addition to the advantages of the present invention enumerated above, and implicit in the description thus far provided, the invention provides further important advantages, not the least of which is the ease with which maps, photographs, etc. may be reduced to the form of data directly useable in the system described. A variety of maps and other source materials, and these to a variety of scales and different contour intervals, and other means for indicating point-elevations, are readily employed. No need exists for the manufacture of special maps, facsimiles, etc. Further, input data can readily be prepared manually by reading and recording, in numerical form, spot elevations given by the source materials; or the input data can be obtained automatically by a variety of simple, known means, for example, by the use of an automatic contour plotter for maps or photographs.

While only one embodiment of the invention has been described in detail herein and shown in the accompanying drawing together with a modification thereof, it will be evident that various further modifications are possible in the arrangement and construction of the guidance system components without departing from the scope of the invention.

I claim:

1. An airborne vehicle guidance system comprising a dead reckoning guidance system and a fixtaking correctional system in operable association with said dead reckoning guidance system for determining the accumulated error of said dead reckoning guidance system, said fixtaking correctional system comprising: an absolute altimeter having an output indicative at any given time of vehicle altitude with respect to a reference datum level; a ground clearance altimeter having an output indicative at any given time of vehicle altitude above terrain; a subtracting means electrically connected to both said absolute altimeter and said ground clearance altimeter for receiving their said outputs and determining the difference therebetween, said subtracting means thereby having an output indicative at any given time of terrain elevation beneath the vehicle; a timing means electrically connected to said subtracting means; an encoding means electrically connected to said timing means; a ground speed indicating means and an initiating means electrically connected to said timing means for supplying the said output of said subtracting means to said encoding means at selected times; a sample data storage means electrically connected to said encoding means for receiving the output therefrom; a pre-recorded data storage means containing pre-recorded terrain infomation; a digital computing means electrically connected to both said sample data storage means and said pre-recorded data storage means, said computing means including electronic means for comparing the said terrain elevations with the said pre-recorded terrain information and determining therefrom actual vehicle location; and means for supplying an indication of said actual vehicle location to said dead reckoning guidance system from said digital computing means.

2. An airborne vehicle guidance system comprising a dead reckoning guidance system and a fixtaking correctional system in operable association with said dead reckoning guidance system for determining the accumulated error of said dead reckoning guidance system, said correctional system comprising: an absolute altimeter having an output indicative at given times of vehicle altitude above a reference datum level; a ground clearance altimeter having an output indicative at given times of vehicle altitude above terrain; a subtracting means electrically connected to both said absolute altimeter and said ground clearance altimeter for determining the difference between their said outputs, said subtracting means thereby having an output of data indicative at any given time of terrain elevation beneath the vehicle; a timing means electrically connected to said subtracting means; an encoding means electrically connected to said timing means; a ground speed indicating means and an initiating means electrically connected to said timing means for supplying the output data of said subtracting means to said encoding means at selected times; a sample data storage means electrically connected to said encoding means for receiving the output therefrom; a pre-recorded data storage means containing pre-recorded terrain information; electronic computing means connected to both said sample data storage means and said pre-recorded data storage means and having an output indicative of actual vehicle location; and means for supplying said output indicative of actual vehicle location to said dead reckoning guidance system.

3. An airborne vehicle guidance system comprising a dead reckoning guidance system and a fixtaking correctional system in operable association with said dead reckoning guidance system for determining the accumulated error of said dead reckoning guidance system, said correctional system comprising: an absolute altimeter having an output indicative at any given time of vehicle altitude above a reference datum level; a ground clearance altimeter having an output indicative at any given time of vehicle altitude above terrain; a subtracting means electrically connected to both said absolute altimeter and said ground clearance altimeter for determining the difference between their said outputs, said subtracting means thereby having an output indicative at any given time of terrain elevation beneath the vehicle; a timing means electrically connected to said subtracting means; a sample data storage means electrically connected to said timing means; a ground speed indicating means and an initiating means electrically connected to said timing means for selectively supplying the output data of said subtracting means to said sample data storage means; a pre-recorded data storage means containing pre-recorded terrain information; electronic computing means electrically connected to both said sample data storage means and said pre-recorded data storage means, said computing means including means for correlating the said terrain elevations with the said pre-recorded terrain information and determining therefrom actual vehicle location; and means for supplying an indication of said actual vehicle location to said dead reckoning guidance system.

4. A vehicle guidance system compising a dead reckoning guidance system and a fixtaking correctional system in operable association with said dead reckoning guidance system for determining the accumulated error of said dead reckoning guidance system, said fixtaking correctional system comprising: terrain sampling means for determining at given times the elevation of terrain beneath the vehicle; sample data storage means electrically connected to said terrain sampling means for storing said terrain elevations; a pre-recorded data storage means containing pre-recorded terrain information; an electronic computing means electrically connected to both said sample data storage means and said pre-recorded data storage means, said computing means including means for correlating the said terrain elevations with the said pre-recorded terrain information and determining therefrom actual vehicle location; and means for supplying an indication of said actual vehicle location to said dead reckoning guidance system.

5. A guidance system comprising a dead reckoning guidance system and a fixtaking correctional system in operable association with said dead reckoning guidance system for determining the accumulated error of said dead reckoning guidance system, said correctional system comprising: terrain sampling means for determining and storing the terrain elevation beneath the terrain sampling means at given times; a pre-recorded data storage means containing pre-recorded terrain information; electronic computing means electrically connected to both said terrain sampling means and said pre-recorded data storage means, said computing means including means for correlating the said terrain elevations with the said pre-recorded terrain information and determining therefrom actual terrain sampling means location; and means for supplying an indication of said actual location to said dead reckoning guidance system.

6. A guidance system comprising a dead reckoning guidance system and a fixtaking correctional system in operable association with said dead reckoning guidance system for determining the accumulated error of said dead reckoning guidance system, said fixtaking correctional system comprising: terrain sampling means for determining at given times terrain elevations beneath the sampling means; a pre-recorded data storage means containing pre-recorded terrain information; electronic computing means in operable association with said terrain sampling means and said pre-recorded data storage means, said computing means including means for analytical correlation of said terrain elevations with said pre-recorded terrain information and determining therefrom actual sampling means location; and means for supplying an indication of said actual location to said dead reckoning guidance system.

7. A fixtaking correctional guidance system for use in conjunction with a dead reckoning guidance system, said correctional system comprising: an absolute altimeter having an output indicative at any given time of the altitude of the same above a reference datum level; a ground clearance altimeter having an output indicative at any given time of the altitude of the same above terrain; a subtracting means electrically connected to both said absolute altimeter and said ground clearance altimeter for receiving their said outputs and determining the difference therebetween, said subtracting means thereby having an output of data indicative at any given time of terrain elevation beneath at least one of the altimeters; a timing means electrically connected to said subtracting means; an encoding means electrically connected to said timing means; a ground speed indicating means and an initiating means electrically connected to said timing means for selectively supplying the said output of said subtracting means to said encoding means; a sample data storage means electrically connected to said encoding means for receiving the output of terrain elevations therefrom; a pre-recorded data storage means containing pre-recorded terrain information; a digital computing means electrically connected to both said sample data means and said pre-recorded data storage means, said computing means including electronic means for comparing the said terrain elevations with the said pre-recorded terrain information and determining therefrom the actual location of at least one of said altimeters; and means for supplying an indication of said actual location to said dead reckoning guidance system.

8. A fixtaking correctional guidance system for use in conjunction with a dead reckoning system for guidance of a body, said correctional guidance system comprising: an absolute altitude sensing device having an output indicative at given times of body altitude above a reference datum level; a surface clearance sensing device having an output indicative at given times of body altitude above a surface; a subtracting means electrically connected to both said absolute altitude sensing device and said surface clearance sensing device for determining the difference between their said outputs, said subtracting means thereby having an output containing data indicative at given times of surface elevation beneath the vehicle; a timing means electrically connected to said subtracting means; an encoding means electrically connected to said timing means; a ground speed indicating means and an initiating means electrically connected to said timing means for supplying the output data of said subtracting means to said encoding means at selected times; a sample data storage means electrically connected to said encoding means for receiving the output therefrom; a pre-recorded data storage means containing pre-recorded terrain information; electronic computing means connected to both said sample data storage means and said pre-recorded data storage means and having an output indicative of actual body location; and means for supplying said output indicative of actual body location to said dead reckoning guidance system.

9. A fixtaking correctional guidance system for use in conjunction with a dead reckoning guidance system for a body, said fixtaking correctional guidance system comprising: surface sampling means for determining and storing the surface elevation relative to a fixed datum beneath the body at any given time; a pre-recorded data storage means containing pre-recorded surface elevation information; electronic computing means electrically connected to both said surface sampling means and said pre-recorded data storage means, said computing means including means for correlating the said surface elevations with the said pre-recorded surface information and determining therefrom actual body location; and means for supplying an indication of said actual location to said dead reckoning guidance system.

10. A fixtaking correctional guidance system for use in conjunction with a dead reckoning guidance system for a body, said dead reckoning guidance system having an accumulative guidance error and said correctional system comprising: a first measuring means for measuring the absolute altitude of the body relative to a reference datum; a second measuring means for measuring body altitude above a surface; subtracting means connected to both said first and second measuring means; timing means connected to said subtracting means; a first storage means connected to said subtracting means through said timing means; a second storage means; and an electronic computer connected to both said first and second storage means.

11. A fixtaking correction system for use in navigation wherein a dead reckoning guidance system having accumulative error is employed, comprising: first and second measuring means; subtracting means connected to said first and second measuring means; a timing means connected to said subtracting means; first and second storage means, said first storage means being connected to said subtracting means through said timing means; and electronic computing means connected to both said first and second storage means.

12. A fixtaking system for a moving body, said system comprising: means for measuring the elevation, with respect to a reference datum, of the earth's crust beneath the moving body at spaced, discrete times; means for supplying known earth-crust elevations; and means for analytically correlating the measured elevations with the known elevations to determine the actual geographic location of the moving body.

13. A fixtaking system for a body adapted for relative movement across a surface which varies in altitude relative to a given reference datum, said system comprising: means for measuring the elevation of said surface relative to said datum and below said body throughout a series of spaced-apart points and for supplying quantized data indicative of the respective elevations at said points; means for supplying known elevations at successive points on said surface spaced similarly to the spacing of said points at which the elevations on said surface are measured; and means for identifying a series of said known successive points on said surface whose elevations most closely match the elevations measured at said series of spaced-apart points.

14. A fixtaking system for a body moving across a surface whose elevation varies relative to a fixed altitude datum, said system comprising: means for sensing and for supplying quantized data descriptive of the shape of a portion of said surface passed over by said body; means providing known, quantized data describing the shape of at least a known portion of said surface; and analytical means for correlating said sensed data with said known data to identify, among said known data, data most closely matching said sensed data.

15. A fixtaking system comprising: first means containing a numerical array descriptive of relative variations in elevation between spaced points on a surface; second means for sensing surface altitude variations at spaced points and for providing output data expressing the same in a form compatible with said numerical array; and analytical means for identifying a portion of said numerical array most closely resembling at least a portion of said output data of said second means.

16. A guidance system for a body having relative motion across a surface whose altitude varies relative to a fixed altitude datum, said system including a dead reckoning guidance system and a fixtaking correctional system, the latter system comprising: surface altitude sampling means for determining at discrete, successive times and points the altitude, relative to said datum, of said surface beneath said body and for providing an acquired sample in the form of numerical data descriptive of said altitudes; pre-recorded data storage means containing numerical data descriptive of the elevation of said surface relative to said datum at successive, spaced points within a known area of said surface; and means for analytical correlaion of said acquired sample with said pre-recorded data and for determining therefrom the actual location of said body relative to said surface when determining the altitude of said surface at a given one of said times and points,

17. A navigational device comprising: means for determining and producing an output indicative of variations of the earth's crust with respect to an altitude datum and as a function of distance along the earth's crust; and means for numerical comparison of said output with known earth-crust altitude variations to determine navigational data.

18. A method of determining the actual location of a moving body comprising the steps of: obtaining a sample of terrain elevations at successive, spaced points beneath the body as the latter moves over a terrain; and analytically correlating the said sample of terrain elevations with pre-recorded, known terrain elevations to obtain the location where the said sample most nearly matches the known pre-recorded terrain elevations and thereby obtaining an indication of actual body location at a time while taking said sample of terrain elevations.

19. A method of determining the actual location of a body comprising the steps of: measuring the absolute altitude of the body; measuring the altitude above terrain of the body; subtracting the altitude above terrain from the absolute altitude to obtain an indication of terrain elevation; repeating the above-enumerated steps as the body moves across the terrain to obtain a plurality of indications of terrain elevation; and analytically correlating the thus-obtained terrain elevations with known terrain elevations to obtain an indication of actual body location.

20. A method of determining the actual location of a body comprising the steps of: measuring terrain elevation at successive, spaced points beneath said body as said body moves over said terrain; and analytically comparing the measured terrain elevations with known terrain elevations to obtain an indication of actual location of the body relative to the terrain at a time during said measuring of terrain elevations.

21. An airborne vehicle guidance system comprising a dead reckoning guidance system and a fixtaking correctional system in operable association with said dead reckoning guidance system for determining the accumulated error of said dead reckoning guidance system, said correctional system comprising: an absolute altitude measuring means having an output indicative at any given time of vehicle altitude above a reference datum level; a ground clearance measuring means having an output indicative at any given time of vehicle altitude above terrain; a subtracting means electrically connected to both said absolute altitude measuring means and said ground clearance measuring means for determining the difference between their said outputs, said subtracting means thereby having an output of data indicative at any given time of terrain elevation beneath the vehicle; a timing means electrically connected to said subtracting means; an encoding means electrically connected to said timing means; a ground speed indicating means and an initiating means electrically connected to said timing means for selectively supplying the output data of said subtracting means to said encoding means; a sample data storage means electrically connected to said encoding means for receiving the output of terrain elevations therefrom; a pre-recorded data storage means containing prerecorded terrain information; a digital computing means electrically connected to both said sample data storage means and said pre-recorded data storage means, said computing means including electronic means for comparing the said terrain elevations with the said pre-recorded terrain information and determining therefrom actual vehicle location; and means for supplying an indication of said actual vehicle location to said dead reckoning guidance system from said digital computing means.

22. The method of determining the actual location of a body relative to a terrain comprising the steps of: moving the body over the terrain; obtaining sample data consisting of digitally expressed terrain elevations at discrete, spaced points beneath said body as the latter moves over a portion of the terrain; providing pre-recorded data comprising digitally expressed terrain elevations at discrete, spaced points within said terrain; and analytically correlating the sample data and pre-recorded data to obtain an indication of actual location of the body within the terrain.

References Cited

UNITED STATES PATENTS 2,847,855 8/1958 Berger -------------- 73—178

RODNEY D. BENNETT, *Primary Examiner.*

CHESTER L. JUSTUS, *Examiner.*

J. L. CROWELL, T. H. TUBBESING, *Assistant Examiners.*